United States Patent [19]

Matsuura et al.

[11] 4,188,421

[45] Feb. 12, 1980

[54] PROCESS FOR TREATING THE SURFACE OF GLASS FIBRE TO IMPART RESISTANCE TO ALKALIS

[75] Inventors: Katsuji Matsuura, Kamagaya; Kunihito Arai, Tokyo, both of Japan

[73] Assignee: Daiichikasei Co., Ltd., Tokyo, Japan

[21] Appl. No.: 889,027

[22] Filed: Mar. 22, 1978

[30] Foreign Application Priority Data

Apr. 5, 1977 [JP] Japan .............................. 52/038802

[51] Int. Cl.² .............................................. B05D 3/02
[52] U.S. Cl. ............................ 427/385 A; 427/385 R; 427/390 R; 427/421; 427/430 R; 428/392; 428/394
[58] Field of Search ............... 427/430 R, 421, 385 R, 427/390 A, 385 A; 428/378, 392, 430, 431, 441, 442

[56] References Cited

U.S. PATENT DOCUMENTS

| | | | |
|---|---|---|---|
| 2,231,471 | 2/1941 | Hill | 428/442 |
| 2,868,668 | 1/1959 | Caroselli et al. | 427/390 A X |
| 3,272,645 | 9/1966 | Duhoo et al. | 427/385 A X |
| 3,413,186 | 11/1968 | Marzocchi | 428/392 X |
| 3,635,879 | 1/1972 | Baer et al. | 428/392 X |
| 3,639,147 | 2/1972 | Benefiel et al. | 427/385 A X |
| 3,948,673 | 4/1976 | Chase et al. | 428/378 X |
| 3,952,135 | 4/1976 | Priddle et al. | 428/442 |
| 4,007,311 | 2/1977 | Harlan | 428/442 X |
| 4,060,657 | 11/1977 | Iwami et al. | 428/442 X |

*Primary Examiner*—Shrive P. Beck

[57] ABSTRACT

A process for treating the surface of glass fibre to impart resistance to alkalis comprising the steps of (1) immersing glass fibre in an aqueous solution of white muddy composition consisting of water-soluble acrylate resin, styrene acrylate copolymer resin, zirconium oxide, titanium oxide, calcium carbonate, plasticizer and solvent or spraying said aqueous solution over glass fibre and (2) drying the glass fibre.

4 Claims, No Drawings

PROCESS FOR TREATING THE SURFACE OF GLASS FIBRE TO IMPART RESISTANCE TO ALKALIS

BACKGROUND OF THE INVENTION

The present invention relates to a method for treating the surface of glass fibre to impart resistance to alkalis.

Glass fibre has hitherto been used widely as a reinforcing material for cement products to improve their strengths, especially impact strength and flexural strength. However, the incorporated glass fibre is very susceptible to alkalis and easily corroded by the high alkalinity of the cement, thus often making impossible to attain the desired purposes. Accordingly, there has been sought for a satisfactory method to treat the surface of glass fibre to impart resistance to alkalis.

SUMMARY OF THE INVENTION

It is, therefore, an object of the present invention to provide a good protection to glass fibre by immersing glass fibre in a surface treating agent having a specific composition or spraying such surface treating agent over glass fibre and drying it to form on the surface of glass fibre a coating of the above surface treating agent and having good elasticity and good adherence to cement.

DETAILED DESCRIPTION OF THE PREFERRED EMBODIMENTS

The preferred examples of the surface treating agents which are used in the present invention can be produced from the following formulations by mixing them thoroughly.

| Surface Treating Agents (A) | |
|---|---|
| Formulations | Parts (% by weight) |
| Water-soluble acrylate resin | 50–60 |
| Styrene-acrylate copolymer resin | 5–10 |
| Zirconium oxide | 2–5 |
| Titanium oxide | 3–5 |
| Calcium carbonate | 5–10 |
| Plasticizer, e.g., dioctylphthalate, dibutylphthalate etc. | 5–10 |
| Solvent, e.g., xylene, toluene etc. | 5–10 |

| Surface Treating Agents (B) | |
|---|---|
| Formulations | Parts (% by weight) |
| Water-soluble acrylate resin | 5–40 |
| Water-soluble styrene-acrylate-copolymer resin | 2–6 |
| Water-soluble etylene-vinyl acetate copolymer resin | 0–11 |
| Water-soluble styrene-butadiene copolymer resin (anion or cation group) | 7–20 |
| Water-soluble neoprene-butadiene copolymer resin (anion or cation group) | 0–10 |
| Zirconium tetrachloride (or zirconium oxide) | 1–3 |
| Titanium oxide | 5–1 |
| Calcium carbonate (fine powder) | 40–2 |
| Talc (fine powder) | 10–5 |
| Plasticizer, e.g., dioctylphthalate, dibutylphthalate etc. | 10–2 |
| Solvent, e.g. xylene, toluene etc. | 19–4 |

The thus formed white muddy composition is diluted with water to a concentration of 10–20% by weight.

The treating method of the present invention comprises immersing glass fibre in the above diluted aqueous solution of the surface treating agent or spraying the solution over glass fibre and subsequently drying it.

By this method, a protective coating having resistance to alkalis is formed in 20–50μ in thickness on the surface of glass fibre, thus accomplishing the desired purposes.

The resistance to alkalis of this coating can probably attributed to the combined effect of acrylate resin, styreneacrylate copolymer resin and zirconium oxide and the adherence with cement particles is probably imparted by titanium pigment and calcium carbonate. The plasticizer and solvent are thought to contribute to the binding of the composition with glass fibre.

The practice of the present invention is further illustrated by the following example.

EXAMPLE

Glass fibre having the following composition (% by weight) and physical properties was used.

| | | |
|---|---|---|
| $SiO_2$ | 52.4 | |
| $R_2O(K_2O + Na_2O)$ | 0.8 | |
| $B_2O_3$ | 10.4 | |
| $Al_2O_3$ | 14.4 | |
| MgO | 5.2 | |
| CaO | 16.6 | |
| Density (g/cm$^3$) | 2.54 | (% by weight) |
| Tensile strength (kg/mm$^2$) | 350 | |
| Elasticity modulus (kg/mm$^2$) | 7250 | |
| Elongation at breakage (%) | 4.8 | |

The glass fibre was immersed in a 15% (by weight) aqueous solution of a white muddy composition having the following formulations for 1 minute and then dried at 60–80° C.

| | | |
|---|---|---|
| Water-soluble acrylate resin | 50 | |
| Styrene-acrylate copolymer resin | 10 | |
| Zirconium oxide | 5 | |
| Titanium pigment | 5 | |
| Calcium carbonate | 10 | |
| Dioctylphthalate | 10 | |
| Xylene | 10 | (% by weight) |

The glass fibre treated as above was subjected to a test for resistance to alkalis.

20g of glass fibre (9μ in diameter; 200 strands) was immersed in a 10% by weight aqueous solution of sodium hydroxide at 70° C. for 60 hours, washed with water and dried at about 100° C. Thereafter, the weight was measured to determine percent loss in weight during exposure to alkali.

The result is as follows:

| | | % loss in weight |
|---|---|---|
| (a) | Glass fibre treated according to the present invention | 2.30 |
| (b) | Untreated glass fibre | 49.90 |

As is evident from the test result, the glass fibre treated by the method of the present invention loses only little weight, which means it is hardly corroded by alkali, whereas the untreated glass fibre shows such great loss in weight as about half, which means significant alkali corrosion.

The physical properties of glass fibre samples (a) and (b) before and after the immersion test are set forth as follows:

|  |  | (a) | (b) |
|---|---|---|---|
| Tensile strength (kg/mm$^2$) | before | 361 | 350 |
| (Asbestos slate JIS A 5403) | after | 357 | 165 |
| Elasticity (kg/mm$^2$) | before | 7860 | 7250 |
| (Izod method) | after | 7511 | 4010 |

As can be seen from the above, the glass fibre treated according to the present invention decreases only little in tensile strength and elasticity, while those of the untreated glass fibre are remarkably reduced.

Furthermore, using both (a) glass fibre treated according to the present invention and (b) untreated glass fibre, cement blocks were fabricated according to the following specification.

| Glass fibre content based on cement (length: 20mm) | 2.5% by weight |
|---|---|
| Ratio of water to cement | 0.3 |
| Sand (No. 7 silca sand): cement | 1 : 2 |

The physical properties including strengths of the cement block of 28 days old are as follows:

|  | Glass treated according to the present invention | Untreated glass fibre |
|---|---|---|
| Flexural strength (kg/cm$^2$) | 380 |  |
| Impact strength (kg · cm/cm$^2$) | 10.3 | Glass fibre became a dampling in appearance and was not dispersed uniformly, thus making mixing impossible. |
| Specific gravity | 1.76 |  |

Thus, the glass fibre treated according to the present invention is not easily corroded by alkali and accordingly this treatment renders glass fibre effective as an reinforcing agent for cement products.

What is claimed is:

1. A method of producing an alakli resistant glass fiber for use in cement products to improve the strength thereof which comprises the steps of coating said glass fiber with an aqueous solution of white muddy composition consisting of

| CONSTITUENT | PARTS (% by weight) |
|---|---|
| Water-soluble acrylate resin | 50–60 |
| Styrene-acrylate copolymer resin | 5–10 |
| Zirconium oxide | 2–5 |
| Titanium oxide | 3–5 |
| Calcium carbonate | 5–10 |
| Plasticizer | 5–10 |
| Solvent | 5–10 | and drying the said coated glass fiber.

2. A method according to claim 1, in which said coating is carried out by immersing said glass fiber in the said aqueous solution of white muddy composition.

3. A method according to claim 1 in which said coating is carried out by spraying said glass fiber with said aqueous solution of white muddy composition.

4. A method according to claim 1, in which said muddy composition is diluted with water to a concentration of about 10–20 percent by weight.

* * * * *